H. L. JOHNSTON.
SUPPORT FOR VEHICLE UMBRELLAS AND VEHICLE CANOPIES.
APPLICATION FILED NOV. 24, 1906.
918,056.
Patented Apr. 13, 1909.
3 SHEETS—SHEET 2.
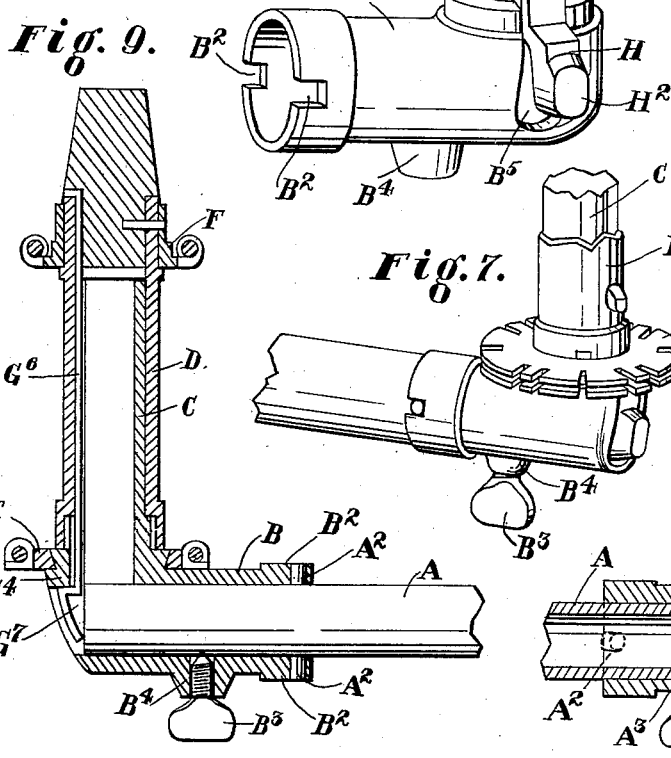
WITNESSES:
INVENTOR.
Herbert L. Johnston
BY Wm. Hubbell Fisher
ATTORNEY.

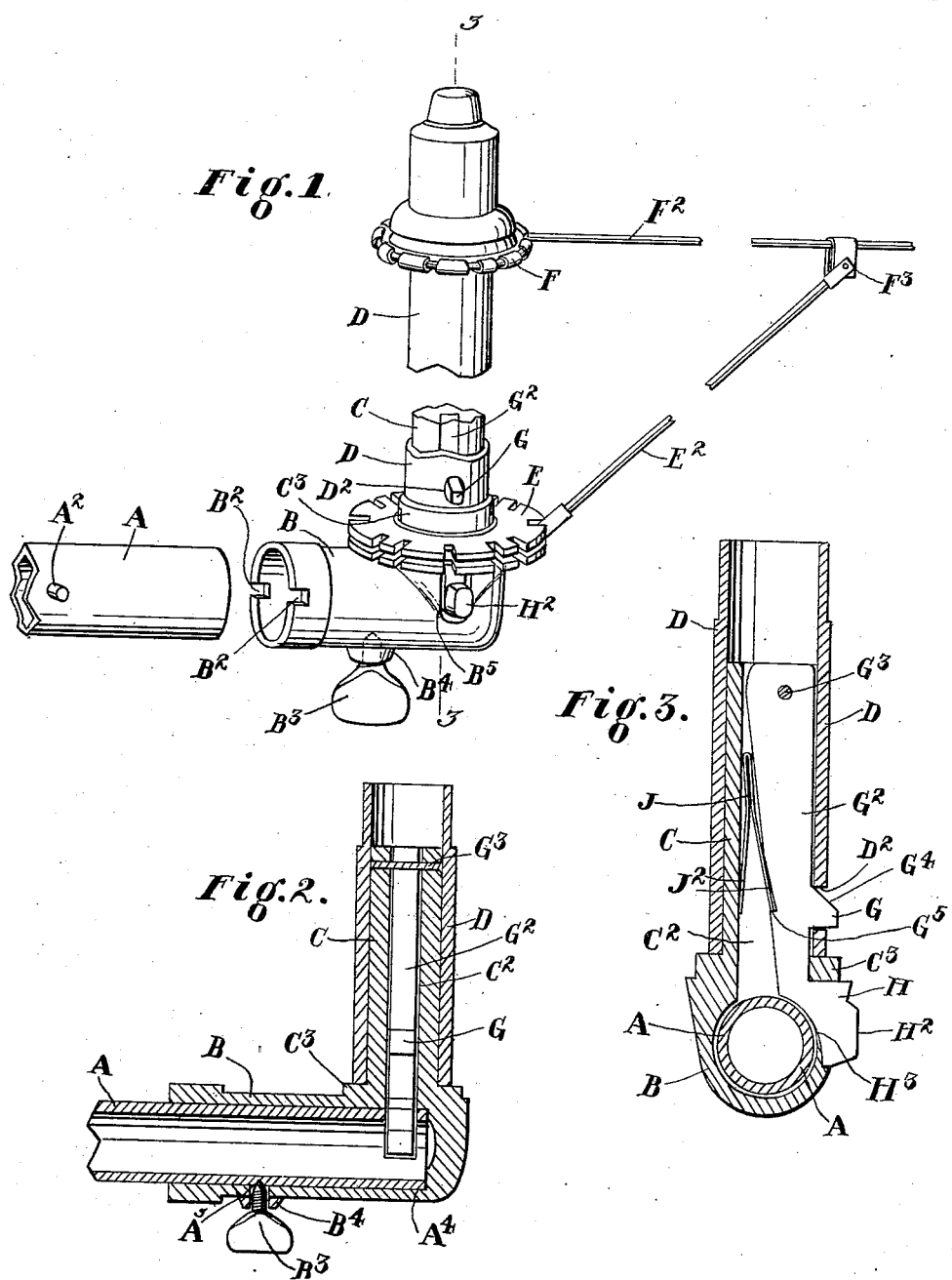

H. L. JOHNSTON.
SUPPORT FOR VEHICLE UMBRELLAS AND VEHICLE CANOPIES.
APPLICATION FILED NOV. 24, 1906.
918,056.
Patented Apr. 13, 1909.
3 SHEETS—SHEET 3.
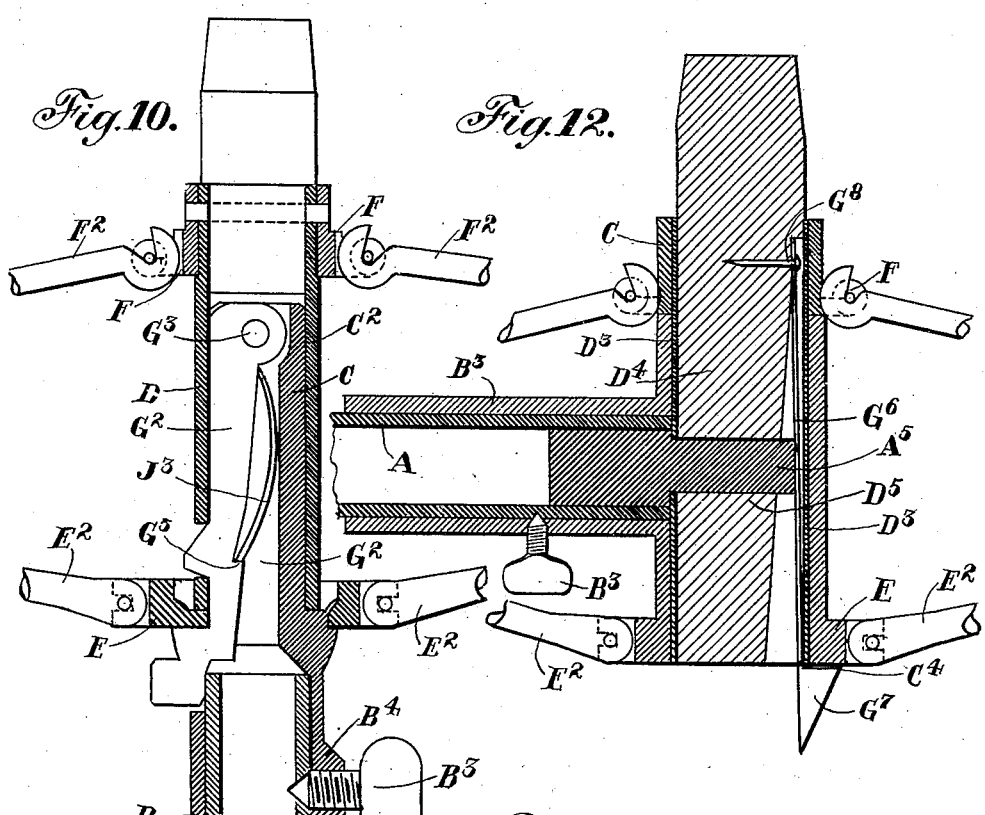
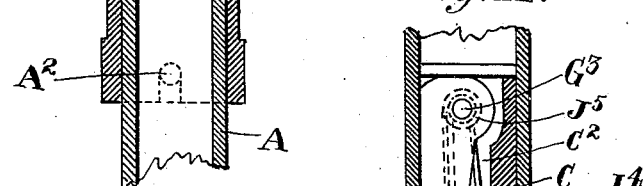
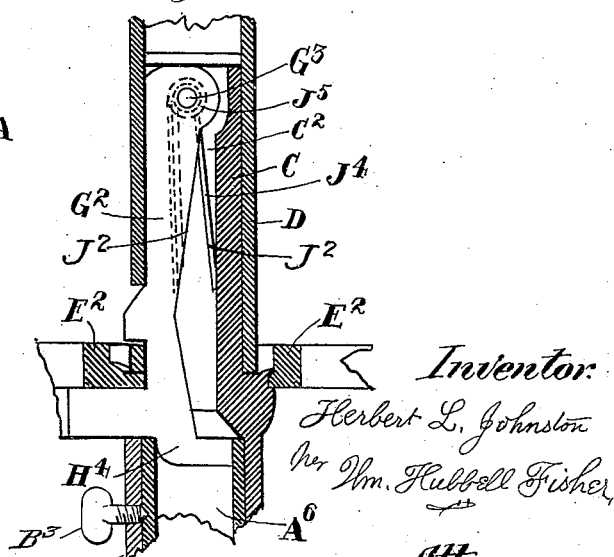
Witnesses:
Inventor:
Herbert L. Johnston
per Wm. Hubbell Fisher
Attorney.

UNITED STATES PATENT OFFICE.

HERBERT L. JOHNSTON, OF TROY, OHIO.

SUPPORT FOR VEHICLE-UMBRELLAS AND VEHICLE-CANOPIES.

No. 918,056.	Specification of Letters Patent.	Patented April 13, 1909.

Application filed November 24, 1906. Serial No. 344,927.

*To all whom it may concern:*

Be it known that I, HERBERT L. JOHNSTON, a citizen of the United States, and a resident of the city of Troy, in the county of Miami and State of Ohio, have invented certain new and useful Supports for Vehicle-Umbrellas and Vehicle-Canopies, of which the following is a specification.

The several features of my invention and the various advantages resulting from their use conjointly or otherwise will be apparent from the following description and claims.

In the accompanying drawings making a part of this application, and in which similar letters of reference indicate corresponding parts,—Figure 1 is a perspective view of the central portion or head of the umbrella and of the adjacent portion of the standard, which latter supports the head. In this view, parts of the runner (tube) and of the stationary stem within the tube, and of the bow and of the stretcher shown are broken away to illustrate the construction and economize the space on the drawing. Fig. 2 is a view partly in section and partly in elevation illustrating the interior construction of the device shown in Fig. 1. In this view, the annular notcher and the stem crown are omitted. The section is a vertical central one, taken in the axial plane of the horizontal tubular portion of the stem. Fig. 3 is a view partly in section and partly in elevation of the device shown in Fig. 1. The section represented is a vertical central one taken in the plane of the dotted line 3, 3, of Fig. 1. It is to be noted that in Figs. 2 and 3, the crown and the notcher and the bow and spreader and the surmounting plug or ferrule of the head are absent; also that in the said Figs. 2 and 3, the adjacent horizontal portion of the supporting standard is not shown as in Fig. 1, separated from its adjacent tube stem, but is shown within the tube stem, in the place it occupies when it supports the umbrella or canopy. Also it should be noted that in said Figs. 2 and 3, the tube stem and tube runner upon the stem are not broken away, but are continuous and normal. Figs. 4, 5 and 6 are additional illustrations of parts of the device illustrated in Fig. 1, namely: Fig. 4 is a view in perspective of the entire tube stem, including its vertical and horizontal portions, and showing the latch which belongs thereto. Fig. 5 is a perspective view of one kind of a spring used with the latch. Fig. 6 is a view in perspective, of the runner tube which in practice fits over the vertical part of the tube stem and is secured in place thereon by the latch. Fig. 7 is a perspective view of part of the device heretofore illustrated, with this exception that the outcome of the latch is at the extreme end of the adjacent portion of the standard. Fig. 8 represents a vertical section of the complete runner and the entire tube stem shown in part in Fig. 7. It also shows in section the adjacent part of the horizontal standard in place within the horizontal portion of the tube stem. The stem crown shown in Fig. 7 is omitted from this Fig. 8. Fig. 9 illustrates partly in elevation and partly in a vertical section taken through the axis of the horizontal portion of the tube stem, and its crown, of the runner, and its notcher, and showing in elevation the adjacent horizontal part of the standard and its lugs, or arms, and the set or clamping screw, as well as a latch of a different kind from that shown and illustrated in Figs. 1, 2, 3, 4, 7 and 8. Fig. 10 is a vertical central section of the head of the umbrella and of the upper part of the supporting standard, but the latch, its spring, those parts of the bows and spreaders which are shown, also the clamping screw and the upper or ferrule end of the head are in elevation. This view illustrates a construction where that part of the supporting standard which is next to the head is vertical. Fig. 11 is a vertical central section of a head, the notcher, the bows and the spreaders being omitted, and of the upper adjacent portion of a vertical standard, a modified form of latch and a useful kind of spring for operating the latch both being shown in elevation and adapted to be locked by the vertical standard. Fig. 12 is a vertical central section of the head and of the adjacent portion of the supporting standard, illustrating a construction wherein the latch is a modification of the latch shown in Figs. 1, 2, 3, 4, 7 and 8, and the horizontal standard is arranged to lock the latch in position.

Wherever in the following specification and claims, the term umbrella is used, it is understood to include the term canopy, the invention hereinafter set forth being applicable to canopies as well as to umbrellas. To both of these the principle of application is the same.

I will now proceed to describe my invention in detail.

A represents the steel pipe standard which is connected to the vehicle.

B indicates that part of the stem which receives the adjacent end of the standard A. This part of the stem as shown in Figs. 1 to 4 is horizontal. The other part C of this stem is vertical. The parts B and C of the stem are fixedly connected, the one to the other, and are preferably integral. The runner D comes down over the stem part C. The usual stem crown E embraces the vertical stem C below the runner, and at or near the place where the upper side of the stem part B joins the vertical stem part C, and this stem crown E is stationary on the stem B, C.

The runner D comes down over the stem part C and rests upon a suitable stop and support. In the present illustrative instance, this runner rests upon the stem crown E, substantially as shown. This runner D is at its upper portion provided with a notcher F. This notcher F pivotally holds the inner end of each bow $F^2$ of the umbrella. The stem crown E pivotally holds the inner end of each of the braces $E^2$ of the umbrella. The braces $E^2$ are at their outer ends respectively connected at $F^3$, in a pivotal manner to the respective bows $F^2$. As the notcher, bows, stem, crown and braces are well and commonly known, further description of them is for the present omitted from this specification.

The standard A is adapted to be united to the stem B, and to be separated therefrom. This adaptability is especially advantageous in permitting the umbrella to be removed from the vehicle without disturbing the standard. Such a construction enables the standard to remain fixed to the vehicle, and be ever ready to enable the umbrella to be placed in position on the vehicle. The preferred mode of connecting it is as follows: The stem B of the umbrella head is made hollow and of a size to receive in a close fitting manner the end of the standard A. To regulate and limit the distance which the standard A shall enter the stem B, a stop-pin or lug $A^2$ is provided. This stop impinges against a part of the stem B. It is necessary that the stem B, C shall not turn upon or relatively to the stem A. If it did so rotate, the umbrella would topple to one side and out of place. To prevent such a rotation, I provide in the stem B the open ended slot $B^2$. As the standard A is inserted in the stem B, the stop lug or pin $A^2$ enters the slot $B^2$ and rests against the inner end of this slot. Therefore the stem B cannot turn on the standard A, and the latter move any farther into the stem. To prevent the standard A from being pulled out of the stem, I provide a suitable device to effectuate such object. A preferred device is the set and binding screw $B^3$, screwed into the stem B at $B^4$. The free point of this screw enters a recess $A^3$ in the lower part of the standard A. When this screw $B^3$ is advanced, it locks the standard A to the stem B. This recess $A^3$ in the standard A is conical, and preferably its center is a trifle farther from the adjacent outer end of the standard A than the axial center of the screw $B^3$ is from the abutment of the inner end of the stem B. Consequently, when the screw $B^3$ is advanced into the recess $A^3$, the screw $B^3$ forces the standard A hard against the abutment. If the standard were shorter, then the advancement of the screw $B^3$ would draw the pins $A^2$, of the standard A respectively tightly against the inner ends of the slots $B^2$. In this way, and by these means, all rattling of the stem against the standard is fully prevented.

By the several means aforementioned, the stem can not turn on the standard A, and the standard cannot move lengthwise back or forth relatively to the stem. The standard being held against the stem, the former cannot vibrate within the latter. Hence all rattling, as the vehicle moves, is prevented.

In Figs. 1, 2, 3 and 4, I illustrate a locking device for locking the runner D of the head to stem B, C. In this locking device there is a latch G located in the side of the head between the notcher and the crown. This latch is capable of a reciprocatory movement. Its shank $G^2$ is preferably suspended from a pivot pin $G^3$. This shank $G^2$ is located within the vertical stem tube C. When so located, the movement of the shank is an oscillatory one, but the movement of the latch is practically a simple back and forth movement.

To allow the latch shank $G^2$ more freedom, and also to save metal, the stem C has a long opening or recess $C^2$ in its side, and the shank is free to occupy this opening, and does fully occupy it, when it, the shank $G^2$, is advanced, and the runner D is locked to the stem D. There is a hole $D^2$ in the runner D. When the runner is slipped down on the stem C, the latch G enters this hole and locks the runner D fast on the stem. Then the runner D cannot go further down on the stem because the shoulder or abutment $C^3$ on the stem C resists such a movement and the runner D cannot slide back, up and off the stem C because the angular shape of the bottom of the latch G engages the runner D at the lower side of the hole $D^2$. The upper side $G^4$ of the latch, see Fig. 4, is inclined downward and outward. When the runner D is descending on the stem C, the lower end of this runner impinges against this incline $G^4$ and pushes back the latch G into and within the recess $C^2$ in the stem C. The runner D then descends until it strikes the abutment $C^3$. At this time, the hole $D^2$ is in front of the latch G and the latter at once enters this hole and occupies the position shown in Figs. 1 and 3. Then as before mentioned, the runner D is locked to the stem C. The latch G is elastically pushed forward by a spring. Therefore the latch will always advance when permitted so to do, and will always enter the hole $D^2$ of the runner D when said hole $D^2$ is opposite the latch.

One description of spring is shown in Figs. 3 and 5, namely: the spring J. This spring J consists of a flat strip of elastic metal, bent into a V-form. The narrow or closed end of the spring is located in the recess $C^2$ of the stem C and behind the latch shank $G^2$. The lower free limbs $J^2$, $J^2$, at their lower or free ends are normally quite wide apart. One of these limbs $J^2$ bears against the back side of the recess $C^2$, and the other limb $J^2$ bears against the rear side of the latch shank $G^2$, and elastically pushes the latter forward, and away from the back of the recess $C^2$. To prevent the spring from sliding down and out of place, I provide a ledge or shoulder $G^5$ on the back side of the shank $G^2$, and the end of the limb $J^2$ of the spring J sets on this ledge $G^5$. As a part of this locking device, I provide means for pushing back the latch G. These means consist in the extension portion H. The shank $G^2$ is extended into this portion H. The side of the stem B is slotted at $B^5$, and this extension H occupies this slot. On the outer part of this extension H is a thumb piece $H^2$. In practice, when the umbrella is to be closed, the head being removed from the standard A of the vehicle, the operator presses on this thumb piece $H^2$, and pushes it back into the recess or slot $B^5$. Such a movement pushes back with it the shank $G^2$ and the latch G, and withdraws the latter from engagement with the runner D. The latter is now moved upon the stem C and the umbrella closed. I make this extension H to perform conjointly with the standard A an additional and very important function, namely: that of locking the latch G in its locking position. To enable the standard A and the extension H to effectuate this function, I make a recess $H^3$ on the rear side of the extension H. This recess $H^3$ when the runner D is locked on the stem C as aforementioned, receives the round of the inner or forward end part $A^4$ of the standard A, that is to say, when the standard A has been inserted into the stem B, see Fig. 2, and the pins $A^2$ are respectively in the slots $B^2$ and the set screw $B^3$ has clamped the standard A in place, then the forward end $A^4$ of the standard A will be behind the extension H, and will be close up against the latter. Then the extension H cannot be pushed back into the slot $B^5$. Consequently the latch shank $G^2$ cannot be pushed back, and the latch G fixed to the shank $G^2$ cannot move back out of the hole $D^2$ of the runner D. The latch G will therefore remain in engagement with the runner D, and will prevent the latter from being moved up on the stem C. Thus the runner D will remain securely locked to the stem C, and cannot be unlocked by the shaking of the vehicle or by an accidental impingement of anything coming in contact with the latch G or the thumb piece $H^2$. The runner D can only be unlocked from the stem C when the standard A is intentionally withdrawn from its place in the stem B. Such an automatic lock is very desirable.

In Figs. 7 and 8, the very same latch and spring are shown, and their relation to the stem C and to the runner D are practically the same as in the mechanism illustrated in Figs. 1 to 6 inclusive, with the single exception that the latch operates at the end of the stem B, and to that extent its location is accordingly moved about in the stem C and the runner D. When the standard A is in place, and secured by the lugs $A^2$, $A^2$, and by the set screw $B^3$, the free or forward end of the standard A prevents the extension H, $H^2$ of the latch from being pushed back, and thereby prevents the unlocking of the runner D from the stem C. In two other illustrative instances, where the latch is above the horizontal plane of the crown E, I have shown convenient methods, where the free end of the standard A is vertical for enabling the standard A to lock the latch in its position of locking the runner D to the stem C. Thus in Fig. 10, the outside of the upper end of the vertical standard A comes close behind the extension H of the latch G and prevents its retraction. It is not until the standard is withdrawn from behind the end of the extension H, that the latch can be retracted, and the runner D unlocked from the stem C. Also in Fig. 11, the inner tail $H^4$ of the extension H fits inside of the space $A^6$ within the vertical standard A. When the latter is moved up to place, it secures the runner D fixedly to the stem C until the securing screw $B^3$ is loosened and the umbrella head is lifted up from the standard A.

Figs. 9 and 12 illustrate modes of enabling the standard A to lock the latch which holds the runner to the stem. In these instances, the latch is one that is connected to the runner D and engages the stem at a point below the crown E. Thus in the head shown in Fig. 9, the upper end of the shank $G^6$ of the latch $G^7$ is fast to the upper or solid part of the runner D above the notcher F. The latch $G^7$ catches under a shoulder $C^4$ of the stem C, and prevents the runner from rising up from the stem C. The standard A when in place in the stem B, and secured in position as aforementioned, has its forward end against the back of this latch $G^7$, and prevents the retraction of the latter and the consequent disengagement of the runner D from the stem C until the standard A is withdrawn.

In the umbrella head shown in Fig. 12, that part of the runner $D^3$ which is below the notcher F runs inside the stem C. The runner $D^3$ carries a solid central portion $D^4$, to which the shank $G^6$ of the latch $G^7$ is connected at $G^8$. The latch $G^7$ goes under the lower end of the stem C and there engages the lower end of the latter. The stem B is connected to the stem C near the middle of the latter. The central portion $D^4$ of the runner has a transverse aperture $D^5$. The free end of the standard A has an extension $A^5$. When the standard A is in place, the extension $A^5$ extends through this aperture $D^5$ and presses against the shank $G^6$ of the latch $G^7$, and prevents its retraction, so long as the standard A remains in position. To unlock the latch from the stem C, the head must be removed from the standard A.

In Fig. 10, a different form of spring $J^3$ is illustrated. This consists of a bowed strip of elastic (spring) metal, one end of which rests on the shoulder $G^5$. The other end is above in the space or recess $C^2$, and the back at its midlength bears against the rear wall of the space $G^2$, namely: against a portion of the stem C.

The latches $G^7$ shown in Figs. 9 and 12 are elastically pressed forward and kept in engagement with the part they are to lock, by means of the elasticity of their shanks which in these instances take the place of separate springs.

In Fig. 11, I have shown a spring $J^4$ which is similar to that spring J shown in Figs. 3, 5 and 8, but has the following named difference. This spring $J^4$ is coiled once about the pivot $G^3$; one of its limbs $J^2$ presses against the back of the recess $C^2$, namely: against the stem C. The other limb $J^2$ shown by dotted lines presses the shank $G^2$ forward and keeps the latch G out in engagement with the runner D. The coil $J^5$ of this spring $J^4$ and the forward leg $J^2$ thereof are preferably located in a recess of the shank $G^2$. Such a recess is indicated by dotted lines in Fig. 11, and will be readily understood. This spring $J^4$ illustrates the preferred construction over the spring J, first herein mentioned, for the reason that when once in place, the spring $J^4$ cannot accidentally fall out of position.

It will be understood that the styles of latches shown in Figs. 9 and 12 are not specifically claimed by me in this application, but the combination of the standard A respectively with them, so as to respectively lock them in position, as hereinbefore specified, comes under one of the features of my invention.

Other features of invention are apparent from the aforesaid description, and from the following claims.

In cases where the standard is advanced into the stem and keeps the latch forward in engagement with the runner and thus locks the runner to the stem, the spring for elastically keeping the latch forward in such engagement may be omitted, but obviously the spring is advantageous for advancing the latch, and in cases where the standard did not lock it, is necessary.

What I claim as new, and of my invention and desire to secure by Letters Patent, is:—

1. In an umbrella head, a crown, a stem for the crown having a horizontal tubular portion and a vertical recessed portion, a runner having a notcher and slidable on the vertical portion of the stem, a latch pivotally hung from the vertical portion of the stem and in part located in the said recess thereof, the notcher runner slidable on the said vertical portion of the stem and provided with an opening above the crown and whose lower edge is engageable by the said latch, the lower end of the said latch extending down into the tubular horizontal portion of the said angulated stem, and provided with a shoulder engaging a projection of the stem and extending through a slot of said stem in position to be reached from the outside, and a horizontal portion of the standard adapted to be connected to the said horizontal portion of the stem and to enter the latter, and when so connected to be behind the latch and prevent the retraction of the latter, substantially as and for the purposes specified.

2. In an umbrella head, the combination of a standard, a runner, a crown, and a stem crown having a tubular support adapted to be connected to and separable from said standard, a latch located above the crown for locking the runner to the stem crown, the latch provided with an extension which enters the tubular support, and adapted to be locked by the said separable standard contacting therewith, substantially as and for the purpose specified.

3. In an umbrella head, the combination of a crown, a notcher, a runner, and a stationary stem crown, and a latch located above the crown and hung from the runner, for locking the runner to the stem crown, a tubular support for the said stationary stem crown C, and a supporting standard, removable and adapted to be connected with said tubular support and to be located against the latch, substantially as and for the purposes specified.

4. In an umbrella head, a crown, a latch located above the crown for locking the runner to the stationary stem crown, the latch provided with an extension, a support for the stem crown into which this extension enters, and a removable standard combined with the stem crown support, and when so combined located behind and against the latch, substantially as and for the purposes specified.

5. In an umbrella head, a crown, a latch, a runner, a stem crown, the latch located and engaging the runner above the crown, and provided with an extension extending below the crown, a tubular support for the stem crown into which the said extension enters, and a supporting standard located against the latch, substantially as and for the purposes specified.

6. In an umbrella head, the combination of a runner, a crown, and a stem crown, the runner located above the crown, a vertical tubular stem C provided with a recess, and a latch having a shank located in said recess, the runner having an aperture located above the crown, and the latch tongue located in said aperture, substantially as and for the purposes specified.

7. In an umbrella head, the combination of a crown, a runner provided with an aperture, a stationary vertical stem on which the runner moves, a latch whose shank is pivotally suspended within and from the said stem and oscillatory within the said stem and in the neighborhood of the crown, and a latch carried by this shank and extended from the stem through said runner for locking the runner adjacent to the crown, substantially as and for the purposes specified.

8. In an umbrella head, the combination of a crown, and the crown stem, a runner thereon, and a latch whose shank is pivotally suspended within and from the stem and oscillatory with this stem, and a latch pivotally carried by the said shank, the runner provided with an aperture above the crown, into which aperture the latch extends, the latch shank having an extension below the latch, provided with a thumb piece extending through the side of the vertical stem at or near the base thereof and below the crown, substantially as and for the purposes specified.

9. In an umbrella head, the combination of a crown, a runner, a vertical stem embraced by the runner, and a latch whose shank is suspended within and from the stem, and is adapted to oscillate back and forth, the said runner provided with an aperture above the crown for the reception of the latch, and a downward extension of the latch shank, this shank provided with a thumb piece located below the crown, and the standard received into that portion of the stem of the crown E which is below this crown, said standard removable from the said crown, and when in place being located against said thumb piece, substantially as and for the purposes specified.

10. In an umbrella head, the combination of a crown, a runner, a vertical stem embraced by the runner, and a latch, adapted to engage the runner above the crown, and to lock the runner to the stem, a horizontal portion of the said stem located below the crown, an extension of the latch shank downward into this portion of the stem, a supporting standard for the said umbrella head separable from the latter, and provided with a lug extending from the side of it, said standard engaging a recess in the horizontal portion of the stem, a set screw for preventing the retraction of the standard, the standard extending into the horizontal portion of the stem and against the said extension of the latch, substantially as and for the purposes specified.

11. In an umbrella head, the combination of a crown, a runner and a stem, and a latch that engages the runner above the crown for locking the runner to the stem, a horizontal portion of the stem, an extension of the latch into this portion, a standard separable from said horizontal stem, and unitable therewith, and means for preventing the rotation of the standard relatively to said horizontal stem, the standard impinging against the extension of the latch, substantially as and for the purposes specified.

12. In an umbrella head, the combination of the stem, the runner, a crown below the runner, a latch shank suspended from the stem and oscillating within the stem, a latch connected to said shank and adapted to engage the runner through a hole in the latter, said hole located above the crown, a spring having the downwardly extended legs elastically separated, the spring having a coil embracing the pivot on which the latch shank is suspended, the legs coöperating to keep the latch elastically advanced, substantially as and for the purposes specified.

13. In an umbrella head, the combination of the stem, the runner, a latch shank pivotally suspended from the stem and oscillating within the stem, a latch connected to said shank and adapted to engage the runner through a hole in the latter, said hole located above the crown, a spring having legs elastically separated, the spring having a coil embracing the pivot on which the latch shank is suspended, the legs coöperating to keep the latch elastically advanced, a standard provided with lugs, the lower portion of the stem adapted to engage the standard and provided with recesses to engage the lugs of the standard, and with a set screw to engage the standard, lugs between the said standard and the stem, and the standard located against the latch, substantially as and for the purposes specified.

HERBERT L. JOHNSTON.

Attest:
J. M. SPENCER,
E. C. BROWN.